United States Patent
Fauconnier et al.

(10) Patent No.: US 8,699,408 B2
(45) Date of Patent: Apr. 15, 2014

(54) METHOD FOR CONTROLLING TRANSMISSION OVER A RADIO CHANNEL BETWEEN A SENDING UNIT AND RECEIVING UNITS AND EQUIPMENTS FOR IMPLEMENTING THE METHOD

(75) Inventors: Denis Fauconnier, Saint Remy les Chevreuse (FR); Sarah Boumendil, Paris (FR)

(73) Assignee: Alcatel Lucent, Paris (FR)

( * ) Notice: Subject to any disclaimer, the term of this patent is extended or adjusted under 35 U.S.C. 154(b) by 1328 days.

(21) Appl. No.: 10/941,794

(22) Filed: Sep. 15, 2004

(65) Prior Publication Data

US 2006/0046733 A1  Mar. 2, 2006

Related U.S. Application Data

(60) Provisional application No. 60/604,303, filed on Aug. 25, 2004.

(51) Int. Cl.
| H04W 4/00 | (2009.01) |
| H04B 7/216 | (2006.01) |
| H04W 36/00 | (2009.01) |
| H04W 72/00 | (2009.01) |
| H04M 1/00 | (2006.01) |

(52) U.S. Cl.
USPC ........... 370/328; 370/342; 370/329; 370/335; 455/442; 455/436; 455/450; 455/525

(58) Field of Classification Search
USPC .............. 455/450, 414.2, 401, 521, 442, 436, 455/525; 370/330, 329, 328, 342, 335; 379/210.01, 404.1
See application file for complete search history.

(56) References Cited

U.S. PATENT DOCUMENTS

| 6,505,253 B1* | 1/2003 | Chiu et al. ................... 709/235 |
| 6,993,342 B2* | 1/2006 | Kuchibhotla et al. ......... 455/450 |
| 7,126,928 B2* | 10/2006 | Tiedemann et al. .......... 370/329 |
| 2003/0176192 A1* | 9/2003 | Morimoto et al. ............ 455/453 |
| 2003/0207697 A1* | 11/2003 | Shpak ........................... 455/524 |
| 2003/0210668 A1* | 11/2003 | Malladi et al. ................ 370/335 |
| 2003/0236085 A1* | 12/2003 | Ho ................................. 455/411 |
| 2004/0101071 A1* | 5/2004 | Naito ............................ 375/340 |
| 2004/0223507 A1* | 11/2004 | Kuchibhotla et al. ......... 370/428 |
| 2005/0058116 A1* | 3/2005 | Palin et al. .................... 370/345 |
| 2005/0250500 A1* | 11/2005 | Xu ................................ 455/442 |
| 2006/0291410 A1* | 12/2006 | Herrmann ..................... 370/328 |
| 2007/0178932 A1* | 8/2007 | Miklos et al. ................. 455/525 |

* cited by examiner

Primary Examiner — Christopher M Brandt
Assistant Examiner — Muthuswamy Manoharan
(74) Attorney, Agent, or Firm — Wolff & Samson, PC

(57) ABSTRACT

The invention relates to a method for controlling transmission over a radio channel between a sending unit and a group of receiving units in a radio communication system, the method comprising the following steps relating to information aimed at a subgroup of at least one receiving unit of said group of receiving units:

transmitting said information over the radio channel from the sending unit;

upon reception of said information, transmitting an acknowledgement from at least each receiving unit of the subgroup, which has received said information correctly over said radio channel; and checking whether acknowledgments have been received by the sending unit from each receiving unit of said subgroup.

25 Claims, 4 Drawing Sheets

METHOD FOR CONTROLLING TRANSMISSION OVER A RADIO CHANNEL BETWEEN A SENDING UNIT AND RECEIVING UNITS AND EQUIPMENTS FOR IMPLEMENTING THE METHOD

CROSS-REFERENCE TO RELATED APPLICATION

This application claims priority to U.S. Provisional Patent Application Ser. No. 60/604,303 filed Aug. 25, 2004 and entitled "HSUPA MAC Signalling," the disclosure of which is incorporated herein by reference for all purposes.

BACKGROUND OF THE INVENTION

The present invention relates to techniques for controlling transmission over a radio channel between a sending unit and a group of receiving units. It is in particular directed to third-generation wireless networks.

In the present description, the invention will be described more particularly in its application, non limiting, to third generation radio communication networks of the UMTS type ("Universal Mobile Telecommunication System"). In this system, the invention finds application within the framework of the High Speed Uplink Packet Access (HSUPA) feature currently being specified by the 3GPP ($3^{rd}$ Generation Partnership Project)—also named "FDD enhanced uplink" in 3GPP terminology, or "E-DCH" according to the transport channel's name. This feature is described particularly in the technical specification TS 25.309, V0.2.0, "FDD Enhanced Uplink; Overall description; Stage 2 (Release 6)", published in June 2004 by the 3GPP.

FIG. 1 shows the architecture of such a UMTS network. The switches of the mobile service 10, belonging to a core network (CN), are linked on the one hand to one or more fixed networks 11 and on the other hand, by means of a so-called Iu interface, to command equipment 12 or RNCs ("Radio Network Controllers"). Each RNC 12 is linked to one or more base stations 13 by means of a so-called Iub interface. The base stations 13, distributed over the territory covered by the network, are capable of communicating by radio with the mobile terminals 14, 14a, 14b called UE ("User Equipment"). The base stations can be furthermore communicate with one another by means of a so-called Iur interface. The RNCs and the base stations form an access network called UTRAN ("UMTS Terrestrial Radio Access Network").

The UTRAN comprises elements of Layers 1 and 2 of the ISO model with a view to providing the links required on the radio interface (called Uu), and a stage 15A for controlling the radio resources (RRC, "Radio Resource Control") belonging to Layer 3, as is described in the 3GPP TS 25.301 technical specification "Radio Interface Protocol Architecture", version 6.0.0 published in December 2003 by the 3GPP. In view of the higher layers, the UTRAN acts simply as a relay between the UE and the CN.

FIG. 2 shows the RRC stages 15A, 15B and the stages of the lower layers which belong to the UTRAN and to a UE. On each side, Layer 2 is subdivided into a radio link control (RLC) stage 16A, 16B and a medium access control (MAC) stage 17A, 17B. Layer 1 comprises a coding and multiplexing stage 18A, 18B. A radio stage 19A, 19B caters for the transmission of the radio signals from trains of symbols provided by the stage 18A, 18B, and the reception of the signals in the other direction.

There are various ways of adapting the architecture of protocols according to FIG. 2 to the hardware architecture of the UTRAN according to FIG. 1 and in general various organizations can be adopted depending on the types of channels (see section 11.2 of the 3G TS 25.401 technical specification "UTRAN Overall Description", version 6.3.0 published in June 2004 by the 3GPP). The RRC, RLC and MAC stages are typically located in the RNC 12. When several RNCs are involved, the MAC sublayer can be apportioned among these RNCs, with appropriate protocols for the exchanges on the Iur interface, for example ATM ("Asynchronous Transfer Mode") and AAL2 ("ATM Adaptation Layer No. 2"). These same protocols may also be employed on the Iub interface for the exchanges between the MAC sublayer and Layer 1.

The RLC sublayer is described in the 3G TS 25.322 technical specification "RLC Protocol Specification", version 6.1.0 published in June 2004 by the 3GPP. In the send direction, the RLC stage 16A, 16B receives, according to the respective logical channels, data streams consisting of service data units (RLC-SDU) arising from Layer 3. An RLC module of the stage 16A, 16B is associated with each logical channel so as in particular to perform a segmentation of the RLC-SDU units of the stream into blocks, or protocol data units (PDU, "Packet Data Units") addressed to the MAC sublayer and comprising an RLC header. In the receive direction, an RLC module conversely performs a reassembling of the RLC-SDU units of the logical channel from the blocks received from the MAC sublayer.

The MAC sublayer is described in the 3G TS 25.321 technical specification "MAC Protocol Specification", version 6.2.0 published in June 2004 by the 3GPP. It transposes one or more logical channels onto one or more transport channels.

The infrastructure of a cellular network typically comprises base stations distributed over the covered territory for communicating with mobile stations located in the zones, or cells, that they serve. The macrodiversity technique consists in providing for a mobile station to be able to communicate simultaneously with separate base stations in such a way that, in the downlink direction (from the base stations to the mobile stations), the mobile stations receive the same information several times and, in the uplink direction, the signal transmitted by the mobile station is picked up by the base stations in order to form different estimates that can then be combined in the network infrastructure.

Macrodiversity procures increased reception that improves the performance of the system due to the combination of different observations of a same information item. It also makes it possible to carry out soft intercellular transfers ("soft handoff", SHO) when the mobile station is moving. Macrodiversity techniques are provided in the UMTS system, in the context of wide band CDMA (W-CDMA) for frequency duplex communications (FDD). For example, the fact that a radio signal value transmitted for example by a UE is received by several Node-Bs is referred to as macrodiversity on the uplink, and such macrodiversity results from the reception of an estimate of radio signal transmitted from the UE, through a so-called active set of Node-Bs.

UMTS proposes a "High Speed Downlink Packet Access" (HSDPA) feature, an overall description of which may be found in the 3GPP 25.308 technical specification "UTRA High Speed Downlink Packet Access (HSDPA); Overall description; Stage 2", version 6.1.0 published in May 2004 by the 3GPP. HSDPA allows high rate downlink transmission, i.e. from a base station to a mobile station, of data to a set of UEs located in the coverage area of the base station. This service is based on a high speed downlink shared transport channel, named HS-DSCH ("High Speed—Downlink Shared Channel"). In the FDD mode, this channel has the following characteristics in particular: (i) a transmission time interval (TTI) of 2 milliseconds corresponding to 3 timeslots of 666 μs; (ii) hybrid processes for requesting data retransmission of the HARQ type ("Hybrid Automatic Repeat reQuest"); and (iii) an adaptive coding and modulation mechanism.

In the access network, part of the MAC layer, the MAC-hs, is located in Node-Bs, so that a higher throughput can be achieved. This architecture is illustrated in FIG. 3, and described in the 3GPP TS 25.401 technical specification "UTRAN overall description", version 6.3.0, release 6, published in July 2004 by the 3GPP.

The above mentioned new "High Speed Uplink Packet Access" (HSUPA) feature, also called "FDD enhanced uplink", is currently being specified by the 3GPP, in order to provide high speed uplink transmission, i.e. from a UE to the access network. This service is based on the so-called "E-DCH", a new type of transport channel which supports HARQ, adaptive modulation and coding, and Node-B scheduling of the uplink data transmissions. At the MAC level, a new MAC termination point, the MAC-e, has been introduced in the UTRAN architecture, and more specifically at the Node-B level. This architecture is illustrated in FIG. 4, and described in the 3GPP TS 25.309 draft specification "Enhanced uplink UTRA FDD; Stage 2", version 0.2.0, published in July 2004 by the 3GPP.

It has been agreed in 3GPP that such a transport channel would support uplink macrodiversity i.e. selection combining. This means that, in a soft handover (SHO) situation, the MAC-e protocol entity in the UE can have multiple peer MAC-e entities in the network i.e. one per Node-B in the active set. It should be noted that there can be only one MAC-e per Node-B, since each Node-B combines the uplink radio links it has with a UE at the physical layer.

The principle is that a PDU submitted to MAC-e in the UE shall be delivered successfully to at least one of a set of Node-Bs. These Node-Bs can then forward the received PDU to the serving RNC. The RNC performs selection combining in the case where several Node-Bs have received the same PDU correctly. The HARQ protocol is designed such that each Node-B independently acknowledges received MAC-e PDUs. The UE may consider a PDU transfer successful if at least one of the set of Node-Bs to which a MAC-e PDU was sent has positively acknowledged the PDU.

In certain situations, it may be beneficial to be more selective than such a transmission scheme to at least one of the Node-Bs. Indeed, in such a scheme, there is no control as to which Node-B effectively receives and acknowledges a PDU. The current HARQ protocol scheme considers that a PDU transmission is complete as soon as at least one Node-B of a set of Node-Bs, regardless of which one in the set, has positively acknowledged the transmitted PDU. However, the transmitted PDU may have been more specifically intended to another particular Node-B of the set of Node-Bs. Therefore, there is no guarantee that said particular Node-B has correctly received the transmitted PDU.

More generally, when using a shared radio channel a sending unit can generally not be sure that a particular receiving unit or a subgroup of receiving units from a group of receiving units has correctly received transmitted information.

The purpose of the invention is to provide an improved scheme. In particular, it is one object of the invention to provide a more selective scheme. Embodiments and benefits of the invention will be detailed afterwards.

SUMMARY OF THE INVENTION

The invention proposes a method for controlling transmission over a radio channel between a sending unit and a group of receiving units in a radio communication system. The method comprises the following steps relating to information aimed at a subgroup of at least one receiving unit of said group of receiving units:
transmitting said information over the radio channel from the sending unit;
upon reception of said information, transmitting an acknowledgement from at least each receiving unit of the subgroup, which has received said information correctly over said radio channel; and
checking whether acknowledgments have been received by the sending unit from each receiving unit of said subgroup.

In an advantageous embodiment of the invention, the receiving units of said group of receiving units are base stations, the sending unit is a radio terminal and the radio channel is a high speed uplink channel, like an E-DCH.

The invention can take place when the sending unit is in a macrodiversity situation with the receiving units of the group of Node-Bs. Alternatively, in certain embodiments, only one receiving unit can compose said group. Also, said subgroup can consist in one or several receiving units.

The invention also proposes a receiving unit among a group of receiving units arranged for receiving information from a sending unit over a radio channel between the sending unit and said group of receiving units, said receiving unit comprising means, relating to information aimed at a subgroup of at least one receiving unit of said group of receiving units, said information containing an indication of the receiving units of the subgroup, for determining whether said receiving unit is one of the receiving units indicated by said indication, and means for acknowledging said information to the sending unit if said receiving unit is one of the receiving units indicated by said indication, wherein the receiving units of said group of receiving units are base stations and the sending unit is a radio terminal, and wherein said radio channel is a high speed uplink channel.

The invention also proposes a sending unit comprising:
means for transmitting information to a group of receiving units over a radio channel, said information being aimed at a subgroup of at least one receiving unit of said group of receiving units;
means for receiving acknowledgments from receiving units which have received said information correctly over said radio channel, and
means for checking whether acknowledgments have been received by the receiving means from each receiving unit of said subgroup.

In a first aspect, the invention proposes a method of determination by a receiving unit that it is the destination (or target) of information, like a MAC PDU, transmitted over the radio channel by a sending unit to a group of receiving units, said receiving unit belongs to. For this purpose, the receiving unit comprises means for determining whether it is one of the receiving units indicated by an indication of receiving units of a subgroup contained in the transmitted information.

In a further aspect, the invention proposes a method of determination by a receiving unit of the type of a MAC PDU transmitted by a sending unit as well as a determination by the receiving unit that it is the destination (or target) of the transmitted MAC PDU.

In yet another aspect, the invention also proposes a protocol for ensuring delivery of transmitted MAC PDU to a subgroup consisting in one or a plurality of target receiving units among a group of one or several receiving units.

According to the first aspect of the invention, several ways of performing the identification of the target receiving unit are provided. In one embodiment, the identity or address of a target receiving unit is indicated in the MAC PDU itself. In case of several target receiving units, a target receiving unit identity or address information can be indicated in the MAC PDU for each of the several target receiving units. In another embodiment, a protocol entity identity or address (typically with higher priority because it is for signaling) is associated with a receiving unit. That is, a correspondence is created between a protocol entity identity or address and a specific receiving unit. In case of several target receiving units, a HARQ protocol entity identity or address can be associated to each of the several target receiving units. Such association can be predetermined as part of a system configuration operation, and stored for instance in a receiving unit or a sending unit.

The receiving units may discard the received MAC PDU for which they are not target. In another embodiment, a receiving unit first determines whether it is the destination (or target) of a received MAC PDU and, responsive to such determination, does not positively acknowledge the received MAC PDUs of which it is not a destination (or target) receiving unit.

In a further aspect, the invention proposes a method of determination by a receiving unit of the type of a MAC PDU transmitted by a sending unit as well as a determination by the receiving unit that it is the destination (or target) of the transmitted MAC PDU. In one embodiment, the identity or address of a target receiving unit as well as information on the type of the MAC PDU is indicated in the MAC PDU itself. In case of several target receiving units, a target receiving unit identity or address information can be indicated in the MAC PDU for each of the several target receiving units, together with information on the type of the MAC PDU.

According to the other aspect of the invention, methods for ensuring the delivery of a given MAC PDU to one or several target receiving units are provided. In one embodiment, the sending unit considers positive acknowledgements originating only from a subgroup consisting in one or some receiving units which are a target for the transmitted MAC PDU. In the case where a plurality of receiving units are targets for a transmitted MAC PDU, the sending unit may need to wait for the reception of positive acknowledgements from each target receiving unit before considering that the transfer is successful. This protocol does not require the receiving units to decode the MAC PDU before sending positive/negative acknowledgements to the sending unit, which is simpler for the receiving unit. Also, receiving units which are not destination (or target) of the PDU have no need to know explicitly which receiving unit is a target receiving unit.

Unless there is a predetermined maximum number of repetitions, the sending unit may repeat the transmission and wait for the reception of positive acknowledgements from each target receiving unit before considering that the transfer is successful. Should there be a predetermined maximum number of repetitions, the sending unit may repeat the transmission and wait for the reception of positive acknowledgements from each target receiving unit up to this predetermined maximum number of repetitions.

The preferred features of the above aspects which are indicated by the dependent claims may be combined as appropriate, and may be combined with any of the above aspects of the invention, as would be apparent to a person skilled in the art.

DESCRIPTION OF PREFERRED EMBODIMENTS

Figure 1:
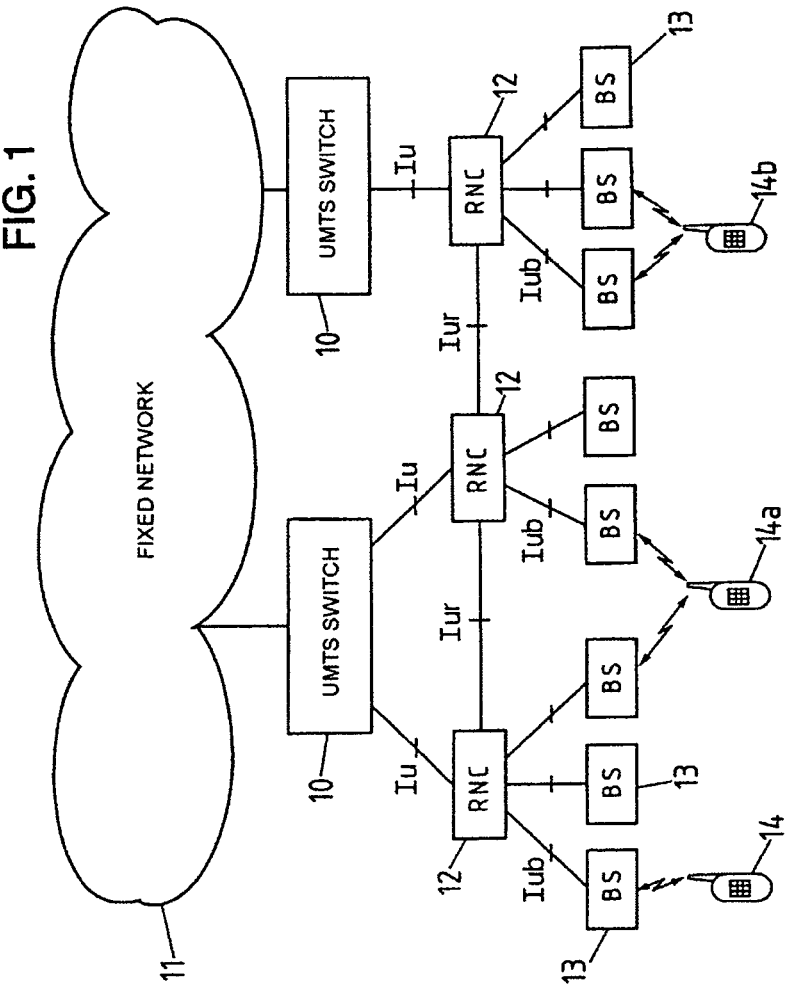
FIG. 1 is a diagram of a UMTS network to which the invention may be applied.
Figure 2:
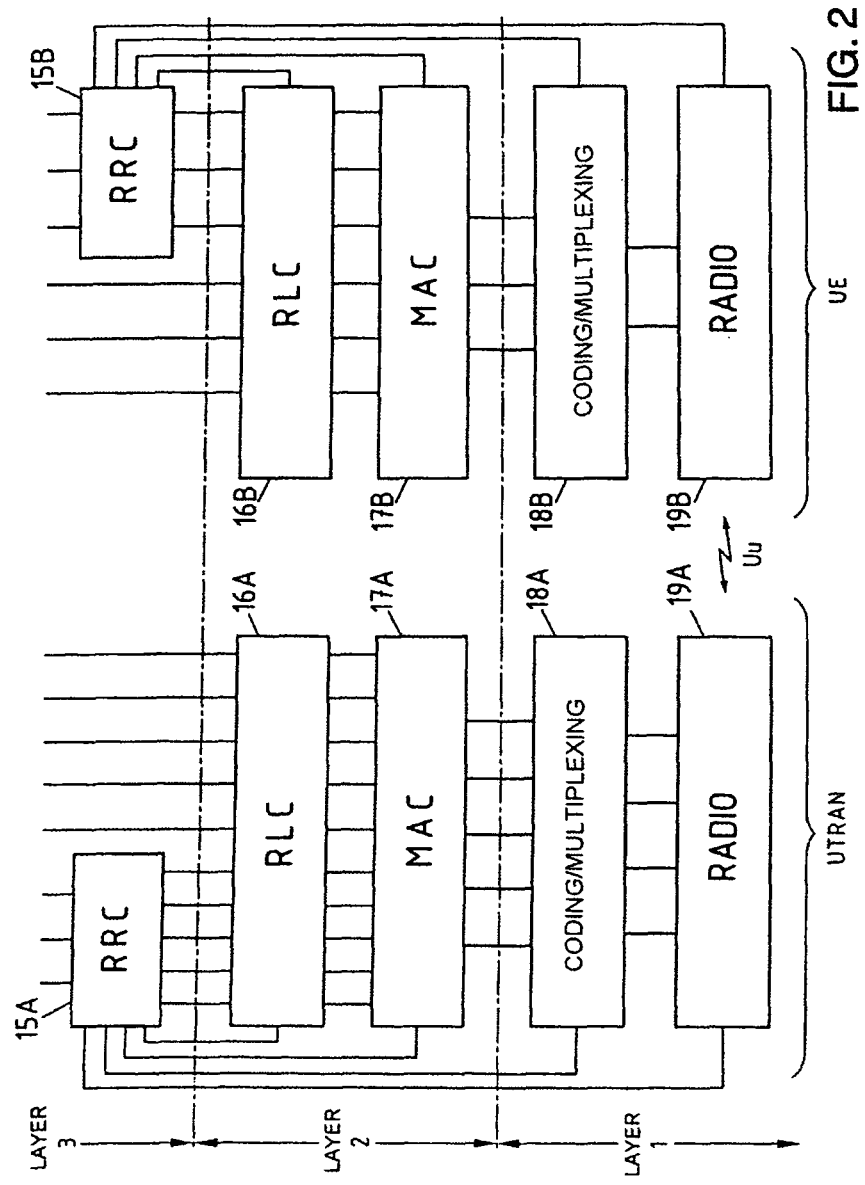
FIG. 2 is a chart showing the organization as layers of communication protocols employed on the radio interface of the UMTS network.
Figure 3:
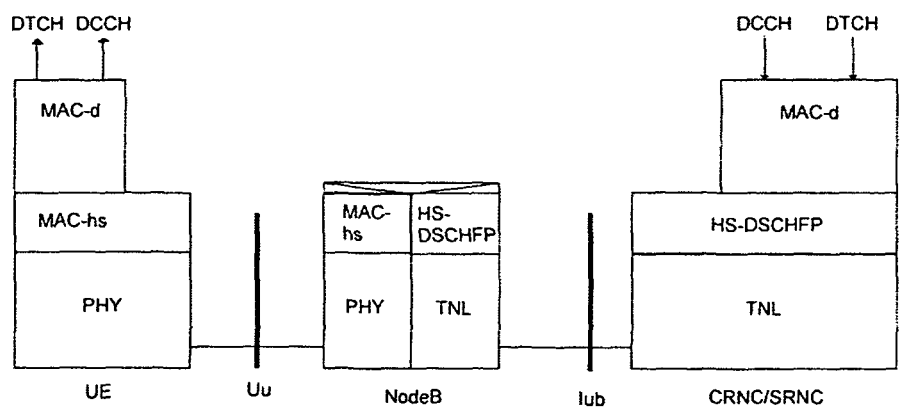
FIG. 3 illustrates the HSDPA protocol architecture.
Figure 4:
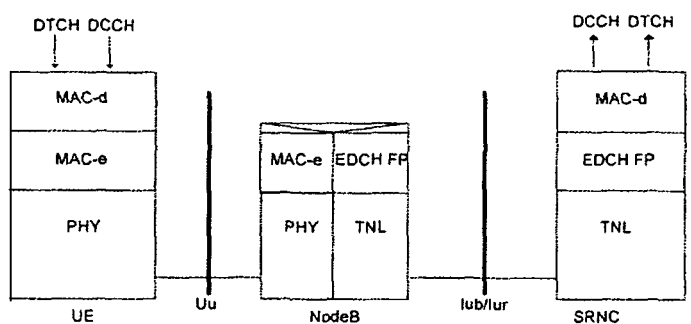
FIG. 4 illustrates the HSUPA protocol architecture.

The invention will now be described in more details in the framework of the UMTS HSUPA feature. The considered radio channel between the sending unit and the group of receiving units is thus a high speed uplink channel, like an E-DCH, between a UE and Node-Bs. Of course, the invention could also apply to other channels or units.

In a first aspect, the invention proposes a determination by a Node-B or a subgroup of Node-Bs that they are the destination (or target) of a MAC-e PDU transmitted by a UE over an E-DCH between the UE and a group of Node-Bs.

In a further aspect, the invention proposes a determination by a Node-B or a subgroup of Node-Bs of the type of a MAC-e PDU transmitted by a UE as well as a determination by the Node-B or the subgroup of Node-Bs that they are the destination (or target) of the transmitted MAC-e PDU.

In yet another aspect, the invention also proposes a protocol for ensuring delivery of transmitted MAC-e PDU to a subgroup of one or a plurality of target Node-Bs among a group of Node-Bs. According to the invention, the currently specified UMTS HSUPA HARQ protocol is improved so as to allow the UE to control the delivery of a MAC-e PDU to one or several specific Node-Bs.

According to the first aspect of the invention, several ways of performing the identification of a target Node-B are provided.

In one embodiment, the identity or address of a target Node-B is indicated in the MAC-e PDU itself. That is, the structure of a MAC-e PDU is designed to incorporate an identity and/or address information of a Node-B. Such information can be coded for instance explicitly, in the form of a binary field, or implicitly, in the form of a bitmap. In case of several target Node-Bs, a target Node-B identity or address information can be indicated in the MAC-e PDU for each of the several target Node-Bs.

In another embodiment, a HARQ protocol entity identity or address (typically a protocol entity with higher priority because the invention is particularly well suited for the reliable transmission of signaling MAC-e PDUs) is associated with a subgroup of one or several target Node-Bs. That is, a correspondence is created between a protocol entity identity or address and a specific Node-B. In case of several target Node-Bs, a protocol entity identity or address can be associated to all or to each of the several target Node-Bs. Also, a protocol entity identity or address can be associated to the whole group of Node-Bs without discrimination, which allows to send MAC-e PDUs that will be received quasi simultaneously by all the Node-Bs of the group. Such association can be predetermined as part of a system configuration operation, and stored for instance in a UE, a Node-B or a RNC.

In a further aspect, the invention proposes a determination by the Node-B that a MAC-e PDU transmitted by a UE is a control PDU, for it, and should not be sent to the RNC. In this way, only the PDU including data only are sent to the RNC, where the different versions of the PDU received by respective Node-Bs can be combined.

In a further aspect, the invention proposes a determination by a Node-B of the type of a MAC-e PDU transmitted by a UE over an E-DCH, as well as a determination by the Node-B that it is the destination (or target) of the transmitted MAC-e PDU. In one embodiment, the identity or address of a target Node-B as well as information on the type of the MAC-e PDU is indicated in the MAC-e PDU itself. In particular, such information can indicate whether or not the transmitted MAC-e PDU is a control PDU. For instance, a simple binary digit can differentiate between a control PDU and a data PDU. Should the transmitted MAC-e PDU be a control PDU, the Node-B does not need to forward it to the RNC. In case of several target Node-Bs, a target Node-B identity or address information can be indicated in the MAC-e PDU for each of the several target Node-Bs, together with information on the type of the MAC-e PDU.

When an indication of the targeted Node-Bs is included in the MAC-e PDU transmitted by the UE over an E-DCH, Node-Bs may discard the received MAC-e PDU for which they are not target and avoid sending them to the RNC. Alternatively, it could be discarded in the RNC. In another embodiment, a Node-B first determines whether it is the destination (or target) of a received MAC-e PDU and, responsive to such determination, does not positively acknowledge the received MAC-e PDUs of which it is not a destination (or target) Node-B.

According to the other aspect of the invention, further methods for ensuring the delivery of a given MAC-e PDU to one or several target Node-Bs are provided. Such methods can in particular be used in a SHO situation. In one embodiment, no indication of one or several target Node-Bs is included in the MAC-e PDU transmitted by the UE over an E-DCH. All the Node-Bs of the group of Node-Bs receiving the E-DCH acknowledge receipt of the MAC-e PDU. The UE considers positive acknowledgements originating only from a subgroup of one or several Node-Bs which are target for the transmitted MAC-e PDU. In the case where a plurality of Node-Bs are targets for a transmitted MAC-e PDU, the UE may need to wait for the reception of positive acknowledgements from each target Node-B before considering that the transfer is successful.

This protocol does not require the Node-Bs of said group to decode the MAC-e PDU before sending positive/negative acknowledgements to the UE, which is simpler for the Node-Bs. Also, Node-Bs which are not destination (or target) of the PDU have no need to know explicitly which Node-B is a target Node-B.

Unless there is a predetermined maximum number of repetitions, the UE may repeat the transmission and wait for the reception of positive acknowledgements from each target Node-B before considering that the transfer is successful. Should there be a predetermined maximum number of repetitions, the UE may repeat the transmission and wait for the reception of positive acknowledgements from each target Node-B up to this predetermined maximum number of repetitions. This departs from the current protocol in which the UE only waits for the reception of a first positive acknowledgment from any of the Node-Bs.

Implementation with Scheduling Information:

With HSUPA, a detailed mechanism is under definition allowing the Node-B to schedule the transmission on the E-DCH based on certain criteria such as uplink load, Node-B utilization, etc.

A UE in SHO is received by multiple Node-Bs, and may be controlled by all these Node-Bs in case of SHO, or only one which would be declared as the master scheduler.

The scheduling needs to be assisted by information about the requirements of the UE i.e. the size of its buffers, the associated priorities, etc. This information is currently estimated to be large and should be provided reliably to the Node-B. Layer 1 signaling is the default 3GPP solution in absence of a better mechanism, but it has been recognized that it is very challenging. Using MAC-e signaling to transport such information has the issues mentioned above in case of SHO i.e. lack of assurance of which Node-B receives the MAC-e PDU. These issues are resolved by the proposed invention.

The proposed invention allows the following:
Transmission using MAC-e of such scheduling information to the master scheduler Node-B, and
Transmission using MAC-e of such scheduling information to all Node-Bs.

Implementation with Node-B Signaling:

Current signaling mechanisms between a UE and a Node-B are based, when HSDPA is configured, on Layer 3 RRC signaling sent on a Signaling Radio Bearer mapped on a dedicated channel. For certain Node-B information, it can easily be extended to use MAC-hs signaling advantageously. In Release 5, MAC-hs PDUs only transfer data and/or higher layer signaling exchanged between the UE and the RNC. Adding a mechanism which allows the Node-B to send signaling information to the UE allows for instance the reconfiguration of some physical layer or HSDPA control parameters more rapidly than using conventional RRC signaling which is generated by the RNC or should go back to the RNC. Examples of such mechanisms are described in FR 2 834 604 for instance.

However no equivalent exists in uplink for these mechanisms, i.e. an uplink channel terminating in the Node-B sufficiently reliable to transport signaling messages. This implies that the downlink signaling information are sent without assurance that they will be applied in the UE because there can be no signaling confirmation of the reconfiguration (a typical signaling exchange comprises a request followed by a confirmation or acknowledgment), and MAC-hs is bound to errors. Indeed, there is no guarantee that they have been correctly received by the UE.

One typical example of reconfiguration is the reconfiguration of HS-SCCH codes (which are HSDPA control channels) for a given UE. If the reconfiguration information is sent to the UE via MAC-hs signaling (which means directly from the Node-B), it is very efficient because there is no need to go back to the RNC to inform the UE. But, if the UE misses the reconfiguration data or the Node-B does not receive any feedback from the UE, then the UE is "lost" because the Node-B does not know which control channel the UE is listening to. Another example is beam-forming.

The proposed invention also addresses the issue in a case where soft handover is supported with HSUPA (MAC-e) but not HSDPA (MAC-hs). The invention indeed provides for an improved process according to which the signaling information sent with MAC-e by the UE may reach the corresponding MAC-e of a first Node-B, said first Node-B being distinct (or not) from a second Node-B carrying MAC-hs. The proposed invention allows for the delivery, even in soft handover condition, to the specific Node-B which is also supporting MAC-hs.

Figure 5:
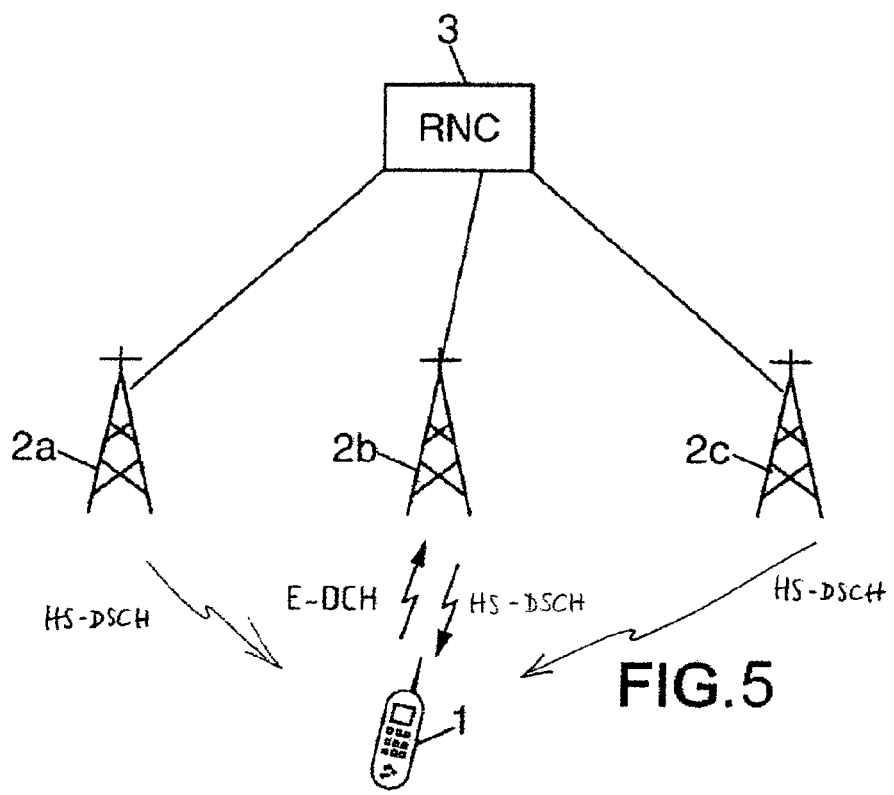
FIG. 5 illustrates a simplified architecture of a system in which an application of the invention can be carried out.

One example of such embodiment is illustrated in FIG. 5 and is described hereinafter. A UE 1 supports both HSDPA and HSUPA features. A group of three Node-Bs 2a, 2b and 2c also support HSDPA and HSUPA features. The UE 1 can transmit information over a high speed uplink channel, like an E-DCH, when in a macrodiversity situation with the three Node-Bs. This means that the information sent by the UE 1 over the E-DCH are received by Node-Bs 2a, 2b and 2c which can forward the different versions of the information received to a RNC 3 they are connected to, e.g. in view of a forthcoming combining at the RNC. On the other hand, Node-B 2b has a high speed downlink channel, like an HS-DSCH, with UE 1.

Considering that Node-B 2b sends a reconfiguration or other information to UE 1 over the corresponding HS-DSCH, UE 1 then responds by sending information, like a confirmation of a reception of the reconfiguration message, over the E-DCH, in order to reach Node-B 2b.

According to the invention, UE 1 can incorporate, in the information to be sent over the E-DCH, an indication that the information are aimed at Node-B 2b. When receiving the information over the E-DCH, each one of the three Node-Bs 2a, 2b and 2c checks in said indication whether it is really targeted. Node-Bs 2a and 2c will conclude that they are not a destination for the transmitted information and they may discard the information, without acknowledging its reception. On the contrary, Node-B 2b will recognize, in said indication, that it is targeted and it can then acknowledge receipt of the transmitted information to UE 1, according to HARQ. This prevents another Node-B from sending an acknowledgment which could be interpreted by UE 1 as a confirmation of reception of the transmitted information by Node-B 2b.

The incorporated indication can be of various type. For example, it can comprise an address or an identity of Node-B 2b also known by said Node-B. Alternatively or additionally, it can comprise a protocol entity address or identity.

For instance, HARQ processes can be used for this. Indeed, several processes related to HARQ are defined for transmission over E-DCH channel, each process being identified by a respective process identifier. Several transmissions can be performed in parallel over one E-DCH using different processes. In a configuration phase, each process can be associated with a set of Node-Bs: for example one process can be respectively associated with each one of Node-Bs 2a, 2b and 2c, and another one can be associated with the three Node-Bs (for transmitting information relevant for all three Node-Bs simultaneously). Upon reception of information over the E-DCH, each one of the three Node-Bs checks whether the process used is one which has been previously associated to it, in order to decide whether it is targeted by such information.

Advantageously, a type of the transmitted information is incorporated by UE 1. For instance, this type can indicate if the transmitted information relates to data or signaling information. The type of information can be detected by Node-B 2b. Node-B 2b can then decide to forward the information received over E-DCH to RNC 3 depending on whether the type of information is data or signaling. In this way, only data could be forwarded to RNC 3 in view of a combining at the RNC, whereas no combination would be performed for signaling.

Alternatively, no indication is included in the information sent by UE 1 over the E-DCH. Thus, the three Node-Bs 2a, 2b and 2c receive the transmitted information more particularly aimed at Node-B 2b. Each Node-B sends an acknowledgement to UE 1 upon reception of said information. The UE 1 can then check whether it has received an acknowledgement from Node-B 2b. If it has not, it can transmit the information again over the E-DCH, until a response has been received from Node-B 2b or until a predetermined number of allowed repetitions is reached.

In this way, the reception of the reconfiguration message from Node-B 2b is rendered safer, because Node-B 2b is always correctly informed of it by confirmation.

Of course many other embodiments could be done under the principles of the present invention.

We claim:

1. A method for controlling transmission over a radio channel between a sending unit and a group of receiving units in a radio communication system, the method comprising the following steps relating to information aimed at a subgroup of a plurality of receiving units of said group of receiving units:
   transmitting said information over the radio channel from the sending unit, wherein the information transmitted over the radio channel from the sending unit contains an indication of the receiving units of the subgroup;
   determining at each receiving unit of said group of receiving units whether said receiving unit is one of the receiving units indicated by said indication;
   receiving a positive acknowledgement from at least each receiving unit of the subgroup, the positive acknowledgment transmitted by each receiving unit of the subgroup indicating that the corresponding receiving unit has received said transmitted information correctly over said radio channel;
   checking whether a corresponding positive acknowledgment has been received by the sending unit from each receiving unit of said subgroup; and
   in response to determining that the corresponding positive acknowledgment has not been received by the sending unit from each receiving unit of said subgroup, re-transmitting said information over the radio channel to all receiving units of said group.

2. A method as claimed in claim 1, wherein said information is further discarded at the receiving units not indicated by said indication.

3. A method as claimed in claim 1, wherein the indication of the receiving units of the subgroup contained in the transmitted information comprises an identity or an address of said receiving units of the subgroup.

4. A method as claimed in claim 1, wherein the indication of the receiving units of the subgroup contained in the transmitted information comprises at least one protocol entity identity or address previously associated with at least one of said receiving units of the subgroup.

5. A method as claimed in claim 1, wherein the information transmitted over the radio channel from the sending unit further contains a type of said information.

6. A method as claimed in claim 5, comprising a further step of detecting, at each receiving unit indicated by said indication, the type of said information.

7. A method as claimed in claim 1, wherein the receiving units of said group of receiving units are base stations and the sending unit is a radio terminal, and wherein said radio channel is a high speed uplink channel.

8. A method as claimed in claim 7, wherein said information comprises scheduling information for at least said high speed uplink channel aimed at the subgroup of receiving units including a master scheduler receiving unit of said group of receiving units.

9. A method as claimed in claim 7, wherein at least one of the receiving units of said group of receiving units supports a high speed downlink packet access feature for sending information to said sending unit over at least one high speed downlink channel, and wherein said information transmitted over a radio channel from the sending unit comprises signaling relating to information received from a receiving unit over a high speed downlink channel.

10. A receiving unit among a group of receiving units arranged for receiving information from a sending unit over a radio channel between the sending unit and said group of receiving units, said receiving unit comprising:
a communications layer to:
receive information aimed at a subgroup of at least one receiving unit of said group of receiving units, said information containing an indication of the receiving units of the subgroup;
determine whether said receiving unit is one of the receiving units indicated by said indication;
send a positive acknowledgement to the sending unit if said information is correctly received and if said receiving unit is one of the receiving units indicated by said indication; and
discard said information if said receiving unit is not one of the receiving units indicated by said indication, wherein the receiving units of said group of receiving units are base stations and the sending unit is a radio terminal, and wherein said radio channel is a high speed uplink channel.

11. A receiving unit as claimed in claim 10, wherein said information comprises scheduling information for at least said high speed uplink channel aimed at the subgroup of receiving units including a master scheduler receiving unit of said group of receiving units.

12. A receiving unit as claimed in claim 10, wherein at least one of the receiving units of said group of receiving units, including said receiving unit, supports a high speed downlink packet access feature for sending information to at least said sending unit over at least one high speed downlink channel, and wherein said information received by said receiving unit over a radio channel from the sending unit comprises signaling relating to information received from a receiving unit over a high speed downlink channel.

13. A receiving unit as claimed in claim 10, wherein the indication of the receiving units of the subgroup contained in said information comprises an identity or an address of said receiving units of the subgroup.

14. A receiving unit as claimed in claim 10, wherein the indication of the receiving units of the subgroup contained in the transmitted information comprises at least one protocol entity identity or address previously associated with at least one of said receiving units of the subgroup.

15. A receiving unit as claimed in claim 10, wherein the communications layer further detects a type of said information further contained in said information.

16. A receiving unit as claimed in claim 15, wherein said receiving unit is connected to a radio network controller and wherein the communications layer further forwards said information to the radio network controller in response to the type of said information being data information, and the communications layer does not forward said information to the radio network controller in response to the type of information being control information.

17. A receiving unit as claimed in claim 10, wherein the communications layer comprises a medium access control (MAC) layer.

18. A sending unit comprising:
means for transmitting information to a group of receiving units over a radio channel, said information being aimed at a subgroup of a plurality of receiving units of said group of receiving units;
means for including an indication of the receiving units of the subgroup in said information to be transmitted by the transmitting means;
means for receiving positive acknowledgments from receiving units which have received said information correctly over said radio channel;
means for checking whether positive acknowledgments have been received by the receiving means from each receiving unit of said subgroup; and
means for re-transmitting said information in response to determining that the corresponding positive acknowledgment has not been received from each receiving unit in the subgroup.

19. A sending unit as claimed in claim 18, wherein the indication of the receiving units of the subgroup comprises an identity or an address of said receiving units of the subgroup.

20. A sending unit as claimed in claim 18, wherein the indication of the receiving units of the subgroup comprises at least one protocol entity identity or address previously associated with at least one of said receiving units of the subgroup.

21. A sending unit as claimed in claim 18, further comprising means for including a type of said information in said information to be transmitted by the transmitting means.

22. A sending unit as claimed in claim 18, wherein the receiving units of said group of receiving units are base stations and the sending unit is a radio terminal, and wherein said radio channel is a high speed uplink channel.

23. A sending unit as claimed in claim 22, wherein said information comprises scheduling information for at least said high speed uplink channel aimed at a subgroup of receiving units including a master scheduler receiving unit of said group of receiving units.

24. A sending unit as claimed in claim 22, comprising means for receiving information over at least one high speed downlink channel from at least one of the receiving units of said group of receiving units supporting a high speed downlink packet access feature, and wherein said information transmitted by said transmitting means comprises signaling relating to information received from a receiving unit over a high speed downlink channel.

25. A method of controlling communication over a radio channel between a sending unit and a group of receiving units in a radio communication system, the method comprising each of the receiving units:
receiving information transmitted over a radio channel by the sending unit aimed at receiving units of a subgroup of the group of receiving units, wherein the transmitted information contains an indication of the receiving units of the subgroup and a type of the information;
determining whether the receiving unit is one of the receiving units of the subgroup indicated by said indication;
sending a positive acknowledgement to the sending unit if said information is correctly received and if said receiving unit is one of the receiving units of the subgroup indicated by said indication; and
discarding said information if said receiving unit is not one of the receiving units of the subgroup indicated by said indication, wherein the receiving units of said group of receiving units are base stations and the sending unit is a radio terminal, and wherein said radio channel is a high speed uplink channel;
determining the type of the received information based at least in part on said indication;
in response to determining that the type of the information is control information, not forwarding the information to a radio network controller; and
in response to determining that the type of the information is data information, forwarding the information to the radio network controller.

* * * * *